3,455,660
HYDRAZINE DERIVATIVES OF NONABORANE AND METHODS OF MAKING THE SAME

William V. Hough, Gibsonia, and Gerald T. Hefferan, Butler, Pa., assignors to Mine Safety Appliances Company, a corporation of Pennsylvania
No Drawing. Continuation-in-part of application Ser. No. 64,221, Oct. 21, 1960. This application Sept. 30, 1963, Ser. No. 312,783
Int. Cl. C01b 6/22, 35/00; G07f 5/02
U.S. Cl. 23—358                        17 Claims

ABSTRACT OF THE DISCLOSURE

Decaborane, hydrazine or a substituted hydrazine and a lower alkyl alcohol are reacted to produce new liquid compounds of the formula $R_xN_2H_{5-x}{}^+B_9H_{14}{}^-$ and $(R_xN_2H_{4-x}B_9H_{13})_n$, where R is lower alkyl or phenyl, $x$ is an integer from 0–4, and $n$ is an integer.

---

This invention relates to a method of producing hydrazine derivatives of nonaborane from decaborane and to the products produced thereby.

We have discovered that the reaction of decaborane with hydrazine or a substituted hydrazine and a lower alkyl alcohol produces two new classes of nonaborane derivatives. For example, decaborane, hydrazine, and methyl alcohol react according to the following equations:

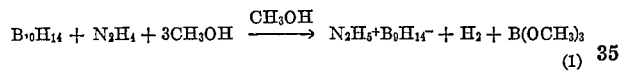

(1)

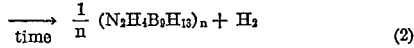

(2)

in which $n$ is an integer. The overall reaction to the product of Equation 2 is:

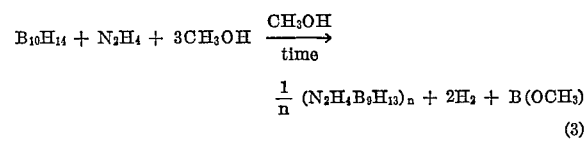

(3)

The product of Equation 1 is hydrazinium tetradecahydrononaborate (1-) and that of Equations 2 and 3 is hydrazine nonaborane(13). Lower alkyl and aryl derivatives of hydrazine may also be used in these reactions to produce the corresponding substituted hydrazine derivative in the product, such as the mono-, di-, tri- and tetramethylethyl-, propyl-, and butyl-hydrazines as well as phenyl hydrazine. Examples, of specific products using substituted hydrazines which are produced according to Equations 1 and 3 are methyl-, sym. dimethyl-, unsym. dimethyl-, and phenylhydrazinium tetradecahydrononaborate (1-) and methyl-, sym. dimethyl-, unsym. dimethyl-, and phenylhydrazine nonaborane(13).

The equimolar reaction of hydrazine or substituted hydrazines with decaborane in a lower alkyl alcohol is initiated immediately upon admixture at room temperature. Within several hours when one mol of hydrogen has been evolved for each mol of decaborane, the reaction to the hydrazine tetradecahydrononaborate (1-) is complete. This compound is stable with only a slow evolution of molecular hydrogen to form the hydrazine monaborane(13). Increasing the purity of the product increases its stability. Gentle heating, up to about 60° C. accelerates this reaction to the nonaborane(13). At higher temperatures the nonaborane(13) begins to decompose with the elimination of hydrogen. Undetermined impurities in the nature of by-products of the reaction catalyze the reaction of Equations 2 and 3. Thus, when the reactants have been highly purified and when the hydrazine is added to the decaborane so that an excess of decaborane is always present, the product hydrazine tetradecahydrononaborate (1-) resists decomposition to the nonaborane (13) derivative. An excess of the hydrazine class of reactants is undesired due to the formation during the reaction of undesired solid or gummy by-products. Equimolar amounts of hydrazine and decaborane is preferred, while excess decaborane can be removed from the product only with some difficulty.

The tetradecahydrononaborate (1-) compounds are very mobile clear, non-volatile liquids. If process impurities are kept out of the final product, they remain stable over a long period of time at room temperature. The hydrazine nonaborane(13) compounds are clear, viscous liquids. They undergo substantial increase in viscosity with the elimination of trace quantities of molecular hydrogen at 50–60° C. At lower temperatures, 40–50° C., the viscosity of these materials increases very greatly when polyfunctional reactants such as tolyl diisocyanate, glycerine, castor oil, or even water are present in 1–3 wt. percent concentration. Products have been thus prepared from which fibers could be drawn and these mixtures with the polyfunctional reactants eventually become clear, hard plastic masses or foams. The hydrazine-nonaboranes are considered to be linear polymers of alternating hydrazine and borane structures with the polyfunctional reactants serving to cross link the linear structures.

The following examples describe the preparation of the new compounds of this invention.

EXAMPLE 1

In a typical experiment 2.74 mmol $B_{10}H_{14}$ and 2.76 mmol of hydrazine in 10 ml. of dry $CH_3OH$ were charged to an evacuated sealed tube reactor at $-196°$ C., warmed to room temperature, and agitated for 18 hours. The volatiles were removed by vacuum condensation and analyzed. Hydrogen evolved was 1.58 mols/mol $B_{10}H_{14}$ (theory is 2/1 for $N_2H_4B_9H_{13}$) and 10.3% of the boron charged was recovered as $B(OCH_3)_3$ (theory is 10.0%) showing a complete conversion of the decaborane. The product was pumped free of trace volatile materials with the evolution of additional hydrogen. Elemental analyses of the clear viscous liquid product were: B, 67.8%; N, 18.9%; H, 12.3%; N—N, 7.05 mmol/g.; theory for $N_2H_4B_9H_{13}$ is: B, 68.3%; N, 19.6%; H, 12.1% and N—N, 7.02 mmol/g.

Synthesis of $B_9H_{13}$ derivatives of substituted hydrazines were carried out in the same manner using equimolar charges of the hydrazine compound and $B_{10}H_{14}$ in methanol and ethanol. Typical analyses were:

|  | Percent | | | | N—N (mm./g.) |
|---|---|---|---|---|---|
|  | B | N | C | H |  |
| $CH_3N_2H_3B_9H_{13}$: |  |  |  |  |  |
| Actual: |  |  |  |  |  |
| Ex. 2 | 61.4 | 17.6 | 7.3 | 12.4 | 6.2 |
| Ex. 3 | 62.3 | 18.0 | 7.5 | 12.5 | 6.5 |
| Theory | 62.1 | 17.9 | 7.8 | 12.2 | 6.4 |
| S.—$(CH_3)_2N_2H_2B_9H_{13}$ |  |  |  |  |  |
| Actual: |  |  |  |  |  |
| Ex. 4 | 56.6 | 16.8 | 15.2 | 12.6 |  |
| Ex. 5 | 56.8 | 16.1 | 14.6 | 12.5 |  |
| Theory | 57.1 | 16.4 | 14.1 | 12.4 |  |
| U.—$(CH_3)_2N_2H_2B_9H_{13}$: |  |  |  |  |  |
| Actual: |  |  |  |  |  |
| Ex. 6 | 55.1 | 16.7 | 15.2 | 12.7 |  |
| Ex. 7 | 56.4 | 16.9 | 14.7 | 12.5 |  |
| Theory | 57.1 | 16.4 | 14.1 | 12.4 |  |
| $C_6H_5N_2H_3B_9H_{13}$: |  |  |  |  |  |
| Actual, Ex. 8 | 45.5 | 11.6 | 29.1 | 9.7 | 4.0 |
| Theory | 44.5 | 12.8 | 32.9 | 9.7 | 4.57 |

The boron was analyzed by micro-Schoeniger techniques, nitrogen by micro-Dumas, and carbon-hydrogen by micro-combustion. The determinations of N—N bond contents were accomplished by the use of a modified gasometric procedure. The infrared spectra of the compounds are typical of base-nonaborane(13) derivatives with the characteristic bands in $CM^{-1}$ 3240 (s), 2500 (vs), 2440 (m), 2360 (m), 1600 (ms), 1400 (s), 1170 (m), and 1025 (m). All of the materials hydrolyze only slowly in the atmosphere. They are soluble in most ethers, thioethers, and amines and insoluble in benzene and toluene. A molecular weight of 146 g./cc. was obtained for $$N_2H_4B_9H_{13}$$

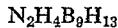

in diphenylamine compared with 142 g./cc. theoretical molecular weight for the monomer. This indicates that $N_2H_4B_9H_{13}$ is essentially all present as the monomer while in solution in diphenylamine. The materials lose small amounts of hydrogen when heated at 50° C. for several days with an increase in viscosity. Reaction of these materials with 1–3 wt. percent tolyl diisocyanate at 40–50° C. gives a transparent glass. Reactions with 1–3 wt. percent of hydroxyl containing polyfunctional reactants gives a rigid foam due to hydrogen evolution.

EXAMPLE 9

When the same procedure is used as that shown by Example 1 except that the reaction is terminated after 1 mol. $H_2$ is evolved for every mol of decaborane used, in these reactions after about 8 hours, the tetradecahydrononaborate (1-) compounds are formed. By holding these products in the reaction zone at room temperature or somewhat higher for an additional period of time, from several hours to several days, further $H_2$ is evolved leading to the nonaborane(13) derivatives. Therefore, the tetradecahydrononaborate (1-) compounds can be recovered by the proper timing of the recovery step. Addition of $$(CH_3)_4NOH$$

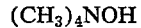

(10% in $H_2O$) to these materials gave a precipitate identified by X-ray, infrared and elemental analyses as the known patterns for $(CH_3)_4N^+B_9H_{14}^-$.

As already indicated we have discovered that the reaction to the tetradecahydrononaborate (1-) can be enhanced by using an excess of decaborane. This is readily accomplished by adding the hydrazine or its derivative stepwise to the decaborane as illustrated in the following example.

EXAMPLE 10

A solution of 45.3 mmols of decaborane in 151.7 grams of methanol is introduced into a Pyrex glass reactor under a nitrogen atmosphere and maintained at 26° C. to 28° C. To this 45.5 mmols of methyl hydrazine in 44.2 grams of methyl alcohol is added dropwise over a period of about 1½ hours. The hydrogen evolved is approximately 100% for the reaction to the desired product. The temperature was then reduced to 20° C. and maintained at this temperature for 20 hours in order to drive off any by-product impurities and to remove any unreacted decaborane. The solvent was then removed by vacuum distillation under a partial vacuum of about 10 mm. and the distillate collected. The methylhydrazinium tetradecahydrononaborate (1-) remaining in the reactor was a clear, flowable liquid with a consistency of twenty weight oil. Its elemental analysis was: B, 60.6%; C, 8.9%; H, 13.3%; N, 18.3 mat./g.; and N—N, 6.2 mmol/g. as compared with the theoretical of B, 61.5%; C, 7.6%; H, 13.3%; N, 17.7 mat./g.; and N—N, 6.3 mmol/g. A number of runs repeating this experiment produced a yield of essentially 100% based on decaborane.

We prefer to use the lower alkyl alcohols including butyl alcohol for ease in removal of any excess alcohol by vacuum distillation at the end of the reaction. We have discovered that the use of the alcohol is critical to success of the process. If other solvent-type materials such as benzene or diethyl ether are used, a distinctly different class of products is obtained. It is preferred that the alcohol be used in excess over that required for reaction so that it serves both as a reactant and as a solvent.

These new compounds are broad spectrum, liquid, non-volatile reducing agents having the reducing characteristics of both hydrazine and boron hydrides. Being liquid they are convenient to use. For example, when hydrazine nonaborane(13) is added to cinnamaldehyde, cinnamic alcohol is produced.

This application is a continuation-in-part of our copending application, Ser. No. 64,221, filed Oct. 21, 1960, now abandoned.

According to the provisions of the patent status, we have explained the principle and mode of practicing our invention and have described what we now consider to be its best embodiments. However, we desire to have it understood that, within the scope of the appended claims, the invention may be practiced otherwise than as specifically described.

We claim:
1. A method of producing hydrazine derivatives of nonaborane of the formula $R_xN_2H_{5-x}^+B_9H_{14}^-$ where R is selected from the class consisting of alkyl radicals having from 1 to 4 carbon atoms and the phenyl radical and $x$ is an integer from 0 to 4 when R is alkyl and $x$ is an integer from 0 to 1 when R is phenyl, which comprises reacting a material selected from the class of $R_xN_2H_{4-x}$ with at least about an equimolar amount of decaborane and with a lower alkyl alcohol at about room temperature until no more than one mol of hydrogen has been evolved for each mol of decaborane, and recovering the resulting product having the formula $R_xN_2H_{5-x}^+B_9H_{14}^-$.

2. A method in accordance with claim 1 in which $x$ is 0 and the product is hydrazinium tetradecahydrononaborate (1-).

3. A method in accordance with claim 1 in which the compound having the formula $R_xN_2H_{4-x}$ is added stepwise to the decaborane during reaction until no more than an equimolar amount has been added with respect to the decaborane, and in which a stoichiometric excess of alcohol is used.

4. A method of producing hydrazine derivatives of nonaborane of the formula $(R_xN_2H_{4-x}B_9H_{13})_n$ where R is selected from the class consisting of alkyl radicals having from 1 to 4 carbon atoms and the phenyl radical, $x$ is an integer from 0 to 4 when R is alkyl and $x$ is an integer from 0 to 1 when R is phenyl, and $n$ is an integer, which comprises reacting a material selected from the class of $R_xN_2H_{4-x}$ with at least about an equimolar amount of decaborane and with a stoichiometric excess of a lower alkyl alcohol until more than one mol of hydrogen has been evolved for each mol of decaborane and recovering the resulting product having the formula $(R_xN_2H_{4-x}B_9H_{13})_n$.

5. A method in accordance with claim 4 in which $x$ is 0, and the product is hydrazine nonaborane(13), $(N_2H_4B_9H_{13})_n$.

6. A compound of the formula $R_xN_2H_{5-x}{}^+B_9H_{14}{}^-$ where R is selected from the class consisting of alkyl radicals having from 1 to 4 carbon atoms and the phenyl radical, and $x$ is an integer from 0 to 4 when R is alkyl and $x$ is an integer from 0 to 1 when R is phenyl.

7. Hydrazinium tetradecahydrononaborate, (1-)

$$N_2H_5{}^+B_9H_{14}{}^-$$

8. Methylhydrazinium tetradecahydrononaborate, (1-) $CH_3N_2H_4{}^+B_9H_{14}{}^-$.

9. Sym. - dimethylhydrazinium tetradecahydrononaborate, (1-) Sym.-$(CH_3)_2N_2H_3{}^+B_9H_{14}{}^-$.

10. Unsym.-dimethylhydrazinium tetradecahydrononaborate, unsym.-$(CH_3)_2N_2H_3{}^+B_9H_{14}{}^-$.

11. Phenylhydrazinium tetradecahydrononaborate, (1-) $C_6H_5N_2H_4{}^+B_9H_{14}{}^-$.

12. A composition of the empirical formula $$(R_xN_2H_{4-x}B_9H_{13})_n$$

where R is selected from the class consisting of alkyl radicals having from 1 to 4 carbon atoms and the phenyl radical, $x$ is an integer from 0 to 4 when R is alkyl and $x$ is an integer from 0 to 1 when R is phenyl, and $n$ is an integer.

13. Hydrazine nonaborane(13), $(N_2H_4B_9H_{13})_n$, where $n$ is an integer.

14. Methylhydrazine nonaborane, $(CH_3N_2H_3B_9H_{13})_n$ where $n$ is an integer.

15. Sym.-dimethylhydrazine nonaborane, $$[(CH_3)_2N_2H_2B_9H_{13}]_n$$

where $n$ is an integer.

16. Unsym. - dimethylhydrazine nonaborane, unsym.-$[(CH_3)_2N_2H_2B_9H_{13}]_n$, where $n$ is an integer.

17. Phenylhydrazine nonaborane, $(C_6H_5N_2H_3B_9H_{13})_n$, where $n$ is an integer.

References Cited

UNITED STATES PATENTS 3,119,652   1/1964   Uchida et al. _____ 23—358

OTHER REFERENCES

Graybill et al. (I), "Inorganic Chemistry," vol. 1, pp. 626–631 (August 1962).

Graybill et al. (II), "Journal of the American Chemical Society," vol. 83, pp. 2673–2676 (1961).

OSCAR R. VERTIZ, Primary Examiner

H. S. MILLER, Assistant Examiner

U.S. Cl. X.R.

23—361; 260—606.5